United States Patent

[11] 3,615,741

[72] Inventor Allan Boy Earl Gilchrist
    Westlake, Ohio
[21] Appl. No. 814,852
[22] Filed Apr. 9, 1969
[45] Patented Oct. 26, 1971
[73] Assignee SCM Corporation
    Cleveland, Ohio
    Continuation-in-part of application Ser. No.
    638,627, May 15, 1967, now abandoned.

[54] CHROMIUM-CONTAINING COMPONENT FOR
    SURFACE COATINGS, PROCESS FOR MAKING
    SAME AND SURFACE COATING COMPOSITIONS
    CONTAINING SAME
    12 Claims, No Drawings
[52] U.S. Cl. .................................................... 106/14,
    106/252, 106/287, 260/18, 260/23, 260/45.75
[51] Int. Cl. ..................................................... C09d 5/08
[50] Field of Search ........................................... 106/266,
    287, 243, 264, 310, 14; 148/6.2

[56] References Cited
    UNITED STATES PATENTS
    3,038,815   6/1962   Kaupp et al. ...................   106/287
    2,693,458  11/1954   Olson ............................   260/2

Primary Examiner—Morris Liebman
Assistant Examiner—T. Morris
Attorneys—Merton H. Douthitt, Harold M. Baum and Howard G. Bruss, Jr.

ABSTRACT: This patent application sets forth a chromium-containing component for surface coatings, the preformed reaction product of an oleophilic, hydrophobic organic acid of low volatility and hydrated chromic oxide in the proportion of about 2–50 grams of $CrO_3$ per each gram equivalent of acid group present in the organic acid, process for making same including the essential arresting of thickening of the reaction product short of a friable gel stage with a base, surface coating compositions incorporating the component, and concentrate compositions incorporating the component, which concentrate compositions are particularly useful in compounding water-dispersed surface coatings.

CHROMIUM-CONTAINING COMPONENT FOR SURFACE COATINGS, PROCESS FOR MAKING SAME AND SURFACE COATING COMPOSITIONS CONTAINING SAME

This application is a continuation-in-part of application Ser. No. 638,627, filed May 15, 1967 now abandoned.

One aspect of this invention is a component for surface coatings, specifically the preformed reaction product of an oleophilic, hydrophobic organic acid of low volatility and hydrated chromic oxide in the proportion of about 2-50 grams of chromic oxide per each gram equivalent acid group present in said organic acid, ensuing thickening of said reaction product being arrested short of a friable gel by subsequent addition of base. The organic acid, suitably dissolved in inert solvent if the acid normally is of high viscosity or is a solid at the operating temperature, and aqueous hydrated chromic oxide solution are mixed at a temperature between about 10° and 100° C. As the resulting product begins to thicken, a base such as an amine is added to prevent the thickening (gelling) from reaching such point that the resulting chromated product yields to shear stress by breaking up into chunks, but instead keeping the material flowable for film-forming utility or compatibility in surface coating compositions.

The thickening or gelling of the product is accompanied by a decrease in pH of the reaction mass. For instance, when the organic acid and the chromic oxide are mixed in an aqueous dispersion, the pH is initially about 2, the reaction mass is relatively thin and fluid, and the color is bright orange characteristic of chromate solutions. As the reaction progresses, the pH gradually decreases while the reaction mass thickens and the color gradually changes to a brownish-green. If the reaction is not arrested with a base, the gelation or thickening will continue to form the friable gel product. The friable gel is, of course, unsuitable for use in film-forming applications and is to be avoided. The pH of the reaction mass prior to the friable gel formation is about 0.5 to 0.7 as measured by standard pH electrodes.

Because the drop in pH from about 2 to about 0.5 to 0.7 accompanies the thickening of the reaction mass, a convenient monitor on the progress of the reaction is provided. It is, of course, impossible to measure the pH of the friable gel but it appears that the pH of the thickening reaction mass is about 0.5 to 0.7 immediately before the friable gel formation. Accordingly the gelation is arrested at a pH above 0.5 to 0.7 by the addition of the base. For best results the pH is prevented from going below about 1 by the addition of the base because the pH becomes increasingly difficult to measure as the thickening progresses. In most applications the pH can be maintained at about 1.0 to 1.5 for ease of handling and good mixing efficiency. At a pH of about 1.0 to 1.5 the reaction mass has a "molasseslike" consistency and is brownish-green in appearance. After the reaction has been arrested with the base, the pH is raised to above about 7 and usually about 8 to 9 to form the inventive surface coating component.

Surface coating compositions can contain from about 1-50 percent by weight of such component in a fluent carrier to yield beneficial effects. The chromium thus combined can impart corrosion protection and other desirable properties to the resulting coating beyond that ordinarily available when no such combined chromium is used, particularly to coatings obtained from coating compositions that are water-reduced for spray, dip, flow, roller, brush, or electrocoating applications. In the latter application particularly, the use of the instant chromium-containing component is especially appropriate because it can bring chromate groups into the protective film without adding other metal ions such as zinc, lead, calcium or the like (which might react with acid resins), and without degrading the electrical resistivity of the aqueous electrocoating dispersion to an undesirably low value. Fairly high electrical resistivity of an electrocoating bath is particularly desirable for efficient electrodeposition of the coating composition.

Another aspect of the invention is a concentrate composition for use in compounding water-dispersed surface coatings, the concentrate comprising, on a pigment and filler-free basis, about 30-90 percent by weight of film-forming vehicle, at least 5/100 of which is the inventive component concerned here, dispersed in about 10-70 percent of a volatile aqueous carrier. The inventive component and coating compositions and concentrates containing same can have a small proportion of phosphoric acid added to them for special purpose, e.g., for making the material particularly useful in coating zinc, galvanized surfaces and aluminum surfaces.

By an oleophilic, hydrophobic organic acid of low volatility I mean such organic acid that is soluble in benzene at room temperature (20° C.) to the extent of at least 10 grams per 100 grams of benzene, having less than 1 percent by weight solubility in water at room temperature, and having a vapor pressure of no more than about 1 mm. Hg abs. at room temperature. The most commonly available of such organic acids are carboxylic acids, advantageously polycarboxylic acids, and preferably film-forming (at curing temperatures up to about 200° C. or below) polymers having a plurality of carboxylic acid groups incorporated into their structure. Such acids will have at least six carbon atoms and generally will have many more. Also useful are organic acids having in their structures acid functionality contributed by the sulfonic acid, phosphonic acid, acid sulfate or acid phosphate groups alone, with each other or in conjunction with carboxylic acid groups. To be sufficiently hydrophobic, however, these latter acid materials most generally are resinous, often will have substantial carboxylic acid functionality in the molecule, and generally must have a much larger number of carbon atoms in their structure than do the useful purely carboxylic acids. The carboxylic acid chain length is not particularly critical as long as the chain is of sufficient length to provide the hydrophobic characteristic described above. The chain length and chemical structure of the acid can be selected to provide the particular properties desired in the coating component. Sufficient carboxylic functionality is required to react or coordinate with the hydrated chromic oxide as described herein. As long as the hydrated chromic oxide is in the proportion of 2-50 grams $CrO_3$ per each gram equivalent of acid group present the conditions of operability are fulfilled.

The hydrated chromic oxide used can be the well known "chromic acid anhydride," $CrO_3$, of commerce dissolved in water, advantageously using at least about four parts of water per part of $CrO_3$, and usually more in order to handle it with comparative safety in contact with organic compounds. In one particularly important embodiment the polycarboxylic is resinous and film-forming, and the chromium content is about 0.01-2 percent by weight of said polycarboxylic acid.

While not intending to be bound by theory, it appears that a type of association or coordination reaction of the chromium occurs. The interaction of the organic acid and the hydrated chromic oxide solution can be handled reasonably well at temperatures up to about 100° C. and preferably at about 40°-70° C. for efficiency and economy. Ordinarily the reaction proceeds very rapidly with thickening and color changes, and can go to a friable gel if not arrested soon enough. The gel is virtually unworkable and useless for practical blending into surface coatings. Hence, when the reaction has proceeded so that thickening results, the thickening must be arrested short of the friable gel stage of a pH not lower than about 0.5 to 0.7 by use of a base, suitably an alkali metal or ammonium hydroxide in aqueous solution, or an aqueous amino base such as a primary, secondary, or tertiary monoamine, polyamine, and/or a mono, di or trialkanolamine. The term base as used herein has its ordinary chemical meaning and refers to a compound which yields hydroxyl ions in aqueous solutions. For water-reducible coatings and particularly for aqueous electrocoating formulations, I use advantageously an ammonium hydroxide or an amine, including an alkanolamine. I prefer, for efficiency and good general performance, to use such amino compound, or a mixture of them whereby at least the major part of any excess amine can be evaporated from the deposited film at paint curing temperatures up to about 200° C.

The mechanism of the thickening reaction is not fully understood. The reaction mass in initially comprised of two phases: an aqueous phase containing the $CrO_3$ component and an organic phase containing the hydrophobic carboxylic acid component. Upon mixing a reaction takes place to form one phase which thickens or gels as the reaction progresses. The pH measurements described herein refer to this one phase reaction mass.

Again not intending to be bound by theory, it would appear that in the bidentate carboxylic acid functional group the carbonyl oxygen forms a coordinate bond with the chromium while the hydroxyl oxygen in the carboxyl group forms a covalent bond with the chromium. Similarly, in the case of acid functionality contributed by polydentate oxygenated sulfur-containing and oxygenated phosphorus-containing acidic structures, e.g., the stable sulfonic ($-SO_3H$), phosphonic ($-P:O(OH)_2$), acid phosphate ($OPO_3H$), bisulfate ($OSO_3H$), and like polydentate acidic structures, some useful degree of like association would appear to obtain for binding chromium into the resulting reaction product.

Significantly, when an aqueous dispersion of chromium-containing component is to be made, the addition of the hydrated chromic oxide to a carboxylic acid that is amine-neutralized, e.g., to pH about 7, does not yield the instant component, but rather one which is demonstrably different; it is much lower in electrical resistivity in dilute water dispersion than is the instant component made by first treating such organic acid with hydrated chromic oxide, then arresting the thickening with the same proportion of the same amine.

Suitable kinds of acids that can be chromated for my broad purposes in accordance with this invention include: $C_{6+}$ mono- and polycarboxylic acids that are oleophilic, hydrophobic, and have low volatility in accordance with the criteria set forth above. As mentioned above the choice and selection of the hydrophobic carboxylic acid depends on the particular coating application involved. Typical types include caproic and higher saturated fatty acids; adipic and higher acids of this series; the unsaturated fatty acids such as oleic, and particularly those which are generally considered siccative because of being derived from drying or semidrying oils such as corn, linseed, tung, soya, and the like; polymers of polyenoic acids having 12–44 carbon atoms, most suitably the so-called "-dimer" acids which are predominantly the dimer of $C_{18}$ monounsaturated fatty acids, etc., principally linoleic with some trimer present; naphthenic acids, substituted benzoic and related aromatic acids, rosin, etc. The useful acids must be normally fluent or readily made fluent for mixing. Those that are not solid at operating temperature of the chromation can be used without solvent dilution. Those that are normally solid or very highly viscous are best dissolved in an inert liquid such as a volatile alkane or aromatic hydrocarbon in proportion sufficient to mix them readily with the hydrated chromic oxide. Those that are normally fluent and miscible with conventional agitation can be used straight or thinned with inert solvent or plasticizer.

Useful film-forming resinous polymeric polycarboxylic acid types for this operation include: coupled siccative oils and corresponding coupled fatty acids, sometimes referred to as "-Clocker adducts" and those coupled oils and fatty acids that are further reacted with a polymerizable vinyl monomer, alkyd resins, e.g., the esterification products of a polyol with a polybasic acid such as those shown in U.S. Pat. No. 3,297,557, and particularly glyceride drying oil-extended and drying oil fatty acid-extended alkyd resins; the foregoing types partly esterified with monobasic alcohols; resinous polyols that have been partly esterified with carboxylic acids; maleinized rosin acids; acidic hydrocarbon drying oil polymers such as those made from maleinized copolymers of butadiene and diisobutylene; acid resins derived from epoxy esters; diphenolic acid and like polymer resins; acrylic and vinyl polymers and copolymers having carboxylic acid groups such as butyl acrylate-methyl-methacrylate-methacrylic acid copolymers, vinyl acetate acrylic acid copolymers, acrylic acid and lower alkyl ($C_{1-4}$) substituted acrylic acid-containing polymers, i.e., those having carboxyl groups contributed by $\alpha, \beta$-unsaturated carboxylic acids or residues of these acids, many of these types being shown also in my U.S. Pat. No. 3,230,162. Where predominantly acid anhydride groups are present in a resin it is, of course, necessary to hydrate them in order to convert the anhydride rings into acid groups, preferably before adding the aqueous chromic acid to them for simplicity of control. Such hydration is done practically and conveniently by mixing water, dosed with a very small proportion of a base such as an amino compound, and the resin at a modestly elevated temperature, e.g., 35°–45° C.

Useful acid resins having in their molecular structure oxygenated sulfur-containing groups and phosphorus-containing groups are shown in my copending U.S. Pat. application Ser. No. 467,390, typical exemplary ones being coupled glyceride drying oils extended with nonheat reactive, oil-soluble phenolic resin, the coupled oil being reacted before such extension with a mixture of polymerizable vinyl monomers, a part of which comprises a polymerizable sulfonic acid such as styrene sulfonic acid or a polymerizable phosphonic acid such as styrene phosphonic acid; similar coupled oils reacted with vinyl acetate, then chlorosulfonic acid, or $POCl_3$ or $PCl_5$; acrylic copolymers containing acrylic acid or a lower alkyl acrylic acid and a polymerizable phosphonic acid or sulfonic acid such as styrene sulfonic acid or phosphonic acid; acrylic acid- or substituted acrylic acid-vinyl acetate copolymers which have been treated with sulfuric and chlorosulfonic acid; and generally those polymers, copolymers, and mixtures of copolymers shown in said copending application.

The chromated component can be blended with various other film-forming resins generally useful in making surface coatings for painting; i.e., spray painting, brush painting, dip painting, electrocoating, roller coating, and other customary techniques. The resinous vehicles usually being classified as natural and synthetic drying oil varnishes, water dispersible resins, water dispersible latices, lacquer vehicles, solvent-soluble resins and the like, typically alkyd resins, drying oils and modified drying oils, hydrocarbon polymers, acrylic resins, polyamide resins, including those having pendant amino groups, (phenolic resins, natural resins, aminoplasts, etc.).

The chromated component often is suitably made from the same acid resin as is used for part or all of a curable acid group-containing resinous vehicle in a paint composition to facilitate compatibility in the resulting film. The resinous vehicles most generally useful for surface coatings have average molecular weights up to about 30,000, many good ones being about 600 to 5,000 on up to about 15,000, although useful latices can be much higher in molecular weight; the resinous organic acids advantageously used in making the chromated component have similar molecular weights in the specified ranges.

The resulting coating composition must be fluent at application temperature to be applied as a surface coating. Accordingly, it must contain a fluent carrier which can be a volatile carrier such as a hydrocarbon paint thinner, alcohol, or water, with or without additional film-forming vehicle over and above the chromated component. Such component is useful in the composition and proportions of about 1–50 percent by weight, the higher proportions in this range being useful in surface coatings wherein the liquid carrier contains a substantial fraction of water optionally mixed with water soluble material such as polyfunctional alcohols and their derivatives.

The preferred liquid carrier contains a substantial fraction of water so that the carrier is most broadly compatible with the water and base brought into the mixture with the chromated component. The most useful of the compositions containing said component have a film-forming vehicle content between about 1 and 35 percent N.V.M. (determined by drying a 1-mil thick film for 30 minutes at 176° C. and weighing the residual, unvolatilized material) and can be applied to substrates most readily by brushing, dipping, spraying, flow coating, or electrocoating, the latter using direct current where the substrate to be coated is wired as an electrode to accept deposition of coating material.

To make up dipping baths, particularly aqueous electrocoating baths containing water-dispersed surface coatings, a concentrate (on a pigment and filler-free basis) of 30-90 percent by weight of film-forming vehicle dispersed in about 10-70 percent of a volatile aqueous carrier can be used. In such concentrate about 0.05 to all of the film-forming vehicle can be the chromated component, particularly if it is resinous. Such component, of course, for making the best permanent coatings is one that is curable alone or with the rest of the resulting film to a tack-free state by air-drying, force-curing, or other conventional means of curing.

The concentrate for adding to a bath used in anodic electrocoating preferably is acidic in character, is capable of neutralizing amino groups or ammonium hydroxide present in the electrocoating composition into which it is blended, and is soluble in or dispersible with organic resins in solution or emulsion form for addition to used electrocoating baths. It then can be dispersed in the aqueous bath to maintain or replenish the resin content and other depleted bath ingredients in balance while desirably reducing pH of the bath that builds up in the electrocoating operation.

Substrates that can be coated are of all conventional sorts. The coatings are particularly useful on steel to yield films that are especially resistant to corrosion, aqueous salt spray, and other deleterious influences. Some phosphoric acid, e.g., $H_3PO_4$, is especially useful in the coatings that are to be applied to zinc, galvanized, or aluminum surfaces. The phosphoric acid, about 2-25 grams per each gram equivalent weight of organic acid present, can be added after the component has been prepared. The total proportion of added phosphoric acid in the composition generally is restricted to about 0.1 to 0.5 percent by weight of the composition to remain compatible while exerting beneficial effect for application onto zinc, galvanized, or aluminum surfaces. If a concentrate composition is to be made for adding and maintaining water dispersed surface coating baths, the phosphoric acid generally is limited to about 0.1-1 percent by weight of the film-forming vehicle for the same reasons.

The surface coating compositions can contain pigment and/or filler such as mineral filler and mineral pigment of the usual sorts or it can have very little or none. It can be tinted if desired. The resulting composition can be classified as paint, enamel, varnish, lacquer, latex paint, electrocoating paint, or the like according to its formulation and end use if the binder or resinous vehicle can be converted into a tack-free film generally characteristic of such film. On the other hand where curing is not important, but protection is adequate when the surface coating composition remains very soft or tacky, such as for temporary service, the resulting coating composition cannot be very well classified as a paint but rather as a temporary protective coating broadly. Where the surface coating is in the nature of a paint, varnish, lacquer, or the like, the usual paint additives such as antifoam agents, dispersing and wetting agents, driers, plasticizers, antiskinning agents, and the like are used in the composition where necessary or desirable.

The bases used to arrest gelation of the chromated component can be many and varied. While alkali metal hydroxides such as sodium hydroxide can be used, they are generally fairly water-sensitive and have limited appeal for formulation into most surface coatings. Ammonia water can be used. The preferred bases, however, are aqueous solutions of amino compounds such as primary, secondary, and/or tertiary primary amines, polyamines, and/or mono, di, or trialkanolamines. Of these, the most preferred are those amino compounds or mixtures of same which will in larger part volatilize away at a surface coating curing temperature up to about 200° C., or react upon film curing to remain bound in the film by chemical reaction to give desirable film build.

With the chromated component in a water-dispersible coating an excess of amino base over and above that simply necessary to arrest the reaction can be used with impunity and, actually, with desirability because such base helps to solubilize or make water-dispersible my otherwise substantially hydrophobic component. To arrest gelation of the component generally at least up to about two equivalents of base are added per chromium atom present, but when more can be used as is the case for water-dispersible compositions, such excess preferably is used.

Of the preferred suitable specific amino compounds useful alone or in mixtures for arresting the gelation, these typical ones can be cited: monoethanolamine, diethanolamine, triethanolamine, N-methyl ethanolamine, N-aminoethylethanolamine, N-methyl diethanolamine, monoisopropanolamine, diisopropanolamine, triisopropanolamine, "polyglycol amines" such as $HO(C_2H_4O)_2C_3H_6NH_2$, hydroxylamine, butanolamine, hexanolamine, methyldiethanolamine, octanolamine, ethylene diamine, diethylene triamine, triethylene tetramine, hexamethylene tetramine, tetraethylene pentamine, propylene diamine, 1,3 diaminopropane, imino-bis-propyl amine, and the like; mono-, di- and tri-lower alkyl ($C_{1\text{-}8}$) amines such as mono-, di- and triethyl amine, dimethyl aminopropylamine, diethyl triamine, N-aminoethyl ethanolamine, N-aminoethyl piperazine, tetraethylene pentamine, triethylene tetramine, and the like.

The following examples show ways in which my invention can be practiced, but should not be construed as limiting the invention. All parts are parts by weight and all percentages weight percentages unless otherwise specifically designated in the specification. Each of the acids chromated in the examples is soluble at room temperature in benzene in a proportion of at least 10 grams per 100, has before any substantial neutralization with base and resulting ionization less than 1 percent by weight solubility in water at room temperature, and has vapor pressure not above about 1 mm. Hg abs. at room temperature. These exemplary acids are often sufficiently fluent to agitate mechanically without addition of solvent or plasticizer and have average molecular weights from about 278 (linolenic) to about 15,000.

Certain of the higher molecular weight polycarboxylic resins, such as the one described in example 2, are quite viscous even before chromation and accordingly the chromation reaction products are also quite viscous even at pH values above 1. This results in difficult pH measurements even before the friable gel stage is reached. When these conditions are encountered, base can be added to the chromation reaction mass at the point when pH measurements become difficult. The addition of this base material will arrest the viscosity and facilitate pH measurements. A stepwise reaction sequence which can be adapted for this purpose is set forth in example 12.

This base addition can be carried out using an amount of base equivalent to 2-4 mols of base per mol of $CrO_3$ in the reaction mass. If viscosity reduction by formation of a water dispersion of the chromation complex is used, sufficient base must be added to neutralize any residual carboxylic acid groups and raise the pH to approximately 7 or higher.

EXAMPLE 1

A chromated component for surface coatings is made as follows by mixing 600 parts of linseed dimer fatty acid with 12 parts of cobalt naphthenate drier containing 6 percent cobalt; then, at a temperature of 40°-65° C., mixing the dimer fatty acid with a solution of 100 parts of $CrO_3$ dissolved in 500 parts of water. The dimer fatty acid is predominantly the dimer of $C_{18}$ monounsaturated fatty acids, predominantly linoleic acid, with some trimer present. The mixture is initially bright orange and has a pH of about 2. The mixture thickens very quickly (about 10-15 minutes) and turns a brownish-green as the pH drops to about 1.0-1.5. The thickening is arrested as the product becomes pasty, at a pH of about 1.0L , but before it reaches a friable gel stage, by addition of 200 parts of dimethyl aminopropylamine in 1,100 parts of water. The resulting thick mass has 36.3 percent solids (N.V.M.) and 63.7 percent water. The component has about 50 grams of chromic oxide per each carboxylic acid group in the dimer fatty acids employed.

The component is diluted with water to an 8 percent dispersion (N.V.M.) having 364 ohm-centimeters specific resistivity at pH of 8.9. In this condition it can be brushed onto, flowed onto, or even electrocoated onto a steel anode panel at direct current voltage of 10 volts using the diluted material as a bath and the container as a cathode. The resulting film is force-cured by baking for 20 minutes at 176° C. to yield a somewhat tacky, soft protective coating.

The product also can be dispersed into a conventional butadiene-styrene latex paint, or an aqueous, water-reducible dipping paint in a proportion of about 1 to 10 percent by weight of the paint composition to provide useful chromium in the resulting film. Similarly, it can be added in proportion of about one-half to 10 percent in solvent-based drying oil-extended alkyd resin paint that will tolerate the water thus added, giving some "false body" or thixotropy to such paint as well as providing some chromium complex in the film.

EXAMPLE 2

Synthetic polycarboxylic acid resin is formed by reacting in an agitator tank 5852 parts of alkali-refined linseed oil and 1373 parts of maleic anhydride at 218° C. for about 3 hours until an Acid Value of 75-85 results, then cooling this intermediate to 157° C., adding 1233 parts of vinyl toluene containing 42 parts ditertiary butyl peroxide and reacting at 218° C. for 1 hour. The resulting vinyl toluenated material is cooled to 157° C. and 1500 parts of nonheat reactive thermoplastic, oil-soluble phenolic resin are added and the temperature is raised to 176° C., and maintained for 1 hour. The phenolic resin is a solid lump resin having softening point of 120°-140° C., specific gravity of 103-105 at 20° C., and it has been stripped to remove excess phenol and lower molecular weight materials. It is the condensation product of about equimolar quantities of paratertiary butyl phenol and formaldehyde. The bulk of the anhydride rings are hydrated to carboxylic acid by mixing 235 parts of the foregoing resin with 23 parts of deionized water and 3 parts of triethylamine at about 65° C.

A paint concentrate for making up electrocoating baths is then compounded by blending into the hydrated resin 10 parts of mineral spirits (a light hydrocarbon having API gravity of 45-49.5 specific gravity at 15.6° C. of 0.78-0.80, and C.O.C. flash point between 37.8° and 46° C.), 51 parts of the chromated dimer fatty acids component made in accordance with example 1, 1 part of antifoam agent (a ditertiary acetylenic glycol with methyl and isopropyl substitution on the tertiary carbon atoms), 5 parts of pine oil, 15 parts of diisopropanolamine dissolved in 111 parts of deionized water, and 178 parts of a pigment grind.

The pigment grind is a mixture of clay, red iron oxide, carbon black and lead chromate, 99.6 parts, suspended in an aqueous dispersion of the same synthetic polycarboxylic acid resin first described in this example. Ten parts of the resin, 3.6 parts of diisopropylamine, 0.2 parts of the acetylenic glycol wetting agent, and sufficient deionized water are used in the pigment grind to make up the 178 parts total.

The foregoing concentrate can be used to replenish painting components in an aqueous electrocoating bath containing the same resinous vehicle and pigments, while simultaneously lowering the pH of the bath because of its capability of neutralizing accumulating base in the bath, the concentrated being used substantially as shown in example 1 of U.S. Pat. No. 3,230,162.

Alternatively, the concentrate can be further reduced with 243½ parts of water, 8½ parts of diisopropanolamine and 2 parts of dimethylaminopropylamine to yield an electrocoating bath dispersion suitable for direct current deposition onto anodic objects at direct current voltage of about 25-500 volts.

The electrodeposited coating is baked in an atmospheric oven at 176° C. for 20 minutes to yield a hard, smooth, durable finish which has substantially improved corrosion resistance and salt-spray resistance over and above the same coating which contains no chromated component.

EXAMPLE 3

The same acidic resin is used as is used in example 2, except that this resin is chromated directly as an organic acid instead of being blended as a vehicle for a special chromated component. Five hundred and thirty parts of the resin, diluted with 40 parts of the same kind of mineral spirits as used in example 2 and 1 part of cobalt naphthenate drier solution containing 6 percent cobalt, are hydrated with 30 parts of water in the presence of 4 parts of dimethyl amino propylamine.

The resulting polycarboxylic acid resin is mixed at 40°-65° C. with a solution of 4 parts of chromic acid dissolved in 40 parts of water. The proportion of $CrO_3$ used is about 3 grams per each carboxylic acid group as determinable by titration to phenolphthalein end point immediately after hydration of the resin. The initial color of the mixture is orangish and the pH is between about 1.7 and 2.0. The viscosity rises rapidly and a greenish coloration appears after a few minutes, while the pH decreases to about 1.0-1.5. If thickening is not arrested at about this stage, the product can turn into a friable gel unsuitable for any substantial utility in surface coating formulations. The reaction mass thickens more rapidly than the reaction mass of example 1 because the carboxylic acid being chromated is more resinous than the dimer fatty acid of example 1. Gelation is arrested as a brownish-green color appears and while the pH is about 1.3 by addition of 2 parts of dimethyl amino propylamine in 30 parts of water.

Thereafter the same wetting agent, pine oil, amines, pigment grind, unchromated dimer fatty acids, drier, and sufficient additional deionized water is added to the acidic resin thus chromated to yield a concentrate having essentially the same fundamental composition as the paint concentrate of example 2 except that it is the acidic resin rather than the dimer fatty acids which is chromated.

The concentrate can be used to replenish an electrocoating bath corresponding in resin binder and pigments, or further diluted with amines and deionized water like the paint concentrate of example 2. pH of the resulting 8 percent solids bath from such dilution is 7.95, and specific resistivity of the resulting aqueous bath dispersion is 2990 ohm-centimeters. This high resistivity makes for good "throw" of the coating under direct current voltage of 250 volts onto an anode immersed in the electrocoating bath contained in a cathodic receptacle. After 2 minutes immersion with power on, the resulting coated anode is removed from the electrocoating bath, rinsed with water and baked for 20 minutes at 176° C. The film is about 1 mil of durable coating. It resists softening, dissolution, and undercutting at the edges of scribe marks made to the bare metal in a standard salt spray test for a time exceeding 300 hours. It resists pitting, blistering, peeling, and disruption and protects the metal quite well from this accelerated corrosion environment, more than 250 hours longer than a like coating which has no such combined chromium and which is deposited in like manner.

EXAMPLE 4

An alkyd resin is made by heating 948 parts of tall oil fatty acids containing 97.6 percent tall oil fatty acids, 1.2 percent rosin acids, and 1.2 percent unsaponifiable content, having an Acid No. of 197, Sap. No. of 198, and Iodine Value of 128, and 155 parts of maleic anhydride at 232.2° C. for one hour, cooling the mixture to 104.4° C., adding 503 parts of technical grade pentarythritol, 394 parts of phthalic anhydride, and 30 parts of xylol (for water entraining solvent), then refluxing the batch at 171.1° C. with separation of water of reaction until an Acid No. of 102.6 is reached in the resulting resin.

A portion of this resin, 450 parts, is mixed at 40°-65° C. with 4 parts of $CrO_3$ dissolved in 40 parts of water, and the thickening arrested before the mixture reaches a friable gel stage by the addition of 2 to 5 parts of dimethyl amino propylamine in 30 parts of water. The proportion of $CrO_3$ used is about 3 grams per each carboxylic acid group in the resin. The resulting chromated resin can be utilized like that of example 3 or compounded with unchromated resin paint binder for use as shown in examples 1 and 2.

EXAMPLE 5

An acrylic resin is made by copolymerizing 60 parts of butyl acrylate with 15 parts of methacrylic acid and 20 parts of styrene in the presence of 1 part of t-butyl perbenzoate and 1 part of benzoyl peroxide in a vehicle of 34.7 parts of 2-butoxy ethanol.

Two hundred and nineteen parts of the resulting acid solution is mixed at 45°–65° C. with a solution of 3.3 parts of chromic oxide dissolved in 36.7 parts of water. The proportion of chromic oxide used is about 10 grams for each carboxylic acid group present in the resin. The color of the reaction mixture is initially orangish but gradually shifts to reddish-brown as the mass thickens. The initial pH of the reaction mass is about 1.8–2.0. Thickening is arrested as in example 3 by addition of 5 parts of dimethyl amino propylamine at a reaction mass pH of about 0.8–1.0. The product can be used in aqueous dispersions useful for dip coating or electrocoating.

EXAMPLE 6

An extended coupled glyceride drying oil paint binder is made by reacting in an agitator tank 8467 parts of alkali-refined linseed oil and 1235 parts of maleic anhydride (heated together at about 232.2° C. for about 3 hours while an Acid No. of 80–90 results), then cooling this intermediate to 157.2° C., adding 920 parts of styrene sulfonic acid and 1200 parts of vinyl toluene containing 48 parts of ditertiary butyl peroxide, and reacting at about 219.3° C. for about an hour. The resulting polycarboxylic-polysulfonic acid resin is then cooled to about 157° C., 5294 parts of the phenolic resin extender of example 2 is heat blended into the composition in a manner like that of example 2, and the resin is hydrated like the resin of example 3.

The hydrated resin, 530 parts, is then mixed at 40°–65° C. with a solution of 4 parts of chromic oxide dissolved in 40 parts of water. The initial color of the reaction mass is orangish and the pH is about 1.8–2.0. The reaction mass thickens as the pH decreases and the color becomes brownish-green. The reaction is arrested at a pH of about 1.0–1.3 by the addition of 2 parts of dimethyl amino propylamine in 30 parts of water to form the inventive component. It can be used like the resin of example 3.

EXAMPLE 7

The procedure of example 6 is repeated except that the resin-forming ingredients employed in the preparation of the example 6 resin are on this occasion employed in the following proportions:

| | |
|---|---|
| linseed oil | 8467 parts |
| maleic anhydride | 1435 parts |
| vinyl toluene | 1200 parts |
| styrene phosphonic acid | 800 parts |

This resin is chromated and arrested with amine like that of the preceding example, and is similarly useful in coating compositions.

EXAMPLE 8

A copolymer of vinyl acetate and acrylic acid is formed by adding equimolar parts of vinyl acetate and acrylic acid in xylene, heating to reflux temperature in the presence of a nitrogen gas blanket and adding a free radical catalyst, ditertiary butyl peroxide, in small increments over a period of about 5 hours using total catalyst addition of about 1 weight percent of the polymerizable monomers in toto.

The resulting copolymer is separated from the solvent, treated with dilute aqueous sulfuric acid at 125° C. for 2 hours, the treated resin separated, washed with water, and dried. The dried treated resin, 1000 parts, is heated to 100° C. with 250 parts of chlorosulfonic acid for about one hour, then neutralized with 20 percent aqueous NaOH. The resulting resin is washed with water and dried, then chromated and arrested with amine like the resin of example 6 for similar service.

EXAMPLE 9

The vinyl acetate-acrylic acid copolymer of example 8 is partially hydrolyzed with sodium hydroxide and treated with $POCl_3$ in 10 percent molar excess ($PCl_5$ also may be used) based on the vinyl acetate content of the copolymer, and heated to about 100° C. for one to 2 hours. The resulting resin is neutralized with aqueous 20 percent sodium hydroxide, separated, washed, and dried for chromation and use like the resin of example 6.

EXAMPLE 10

Linseed oil fatty acids, 600 parts, and 12 parts of the same cobalt naphthenate drier as used in example 1 are mixed at 40°–65° C. with a solution of 100 parts of $CrO_3$ dissolved in 500 parts of water. The initial pH of the reaction mass is about 1.7–2.0 and the mass is orangish in color. Thickening is arrested as the product becomes pasty at a pH of about 1.0–1.3 like that of example 1 by the addition of 220 parts of dimethyl amino propylamine in 1100 parts of water. The resulting chromated component can be used like the chromated component made in accordance with example 1 to impart chromium into aqueous surface coatings, aqueous emulsions containing safflower oil, linseed oil, or the like.

EXAMPLE 11

To further demonstrate the progression of the reaction between the organic acid and the hydrated chromic oxide the following experiment was conducted.

Six hundred grams (1 mol) of the dimer fatty acid described in example 1 is placed in a stirred vessel and the temperature is maintained at 125° F. One hundred grams (1 mol) of $CrO_3$ is dissolved in 500 grams of water to form 600 grams of solution. The solution is divided into four aliquot portions.

The first aliquot portion is slowly added to the dimer fatty acid with stirring while the temperature is maintained at 125° F. After about 5–10 minutes of stirring the reaction mass assumes a mustard yellow color and the pH is about 2.0–2.3.

The second aliquot is similarly added and the reaction mass continues and assumes a golden brown coloration. The pH is measured to be about 1.5 after about 5–10 minutes of stirring.

The third aliquot portion is similarly added and the mixture stirred for 5–10 minutes. The mixture continues to thicken to syruplike consistency, assumes a brownish-green appearance and has a pH of about 1.2.

The last aliquot is similarly added and stirred for about 5–10 minutes. At the end of this period the pH is about 0.7–1.0 and the mixture is a dark brownish-green and has a molasseslike consistency.

One-half of the reaction mass is withdrawn and brought to a pH of about 8–9 with dimethyl aminopropylamine as in example 1 to produce a surface component suitable for use in the present invention.

The remaining one-half of the reaction mass is allowed to stir without neutralization and after about 30 minutes of additional stirring the reaction mass solidifies in the form of a friable gel. Amine is added to the friable gel but the gel does not disperse or dissolve therein. Experiments using dimer fatty acid demonstrate the limits of operability of the present reaction sequence.

EXAMPLE 12

This example demonstrates how the sequence of addition of base and chromic oxide can be varied in preparing the inventive components. Six hundred grams (1 mol) of the dimer fatty acid described in example 1 is placed in a stirred vessel and the temperature is maintained at 125° F.

A base solution is prepared by diluting 300 grams (4 mols) of monoisopropanol amine in 300 grams of water to form 600 grams of solution.

On hundred grams (1 mol) of $CrO_3$ is dissolved in 500 grams of water to form 600 grams of chromic oxide solution.

Three hundred grams of this chromic oxide solution (one-half mol of $CrO_3$) is slowly added to the dimer fatty acid with stirring while the temperature is maintained at 125° F. After about 10 minutes of stirring the reaction mass assumes a mustard yellow color and beings to thicken slightly. The pH is measured to be about 1.5.

One hundred and fifty grams of amine solution (1 mol of monoisopropanol amine) is added to the reaction mass and stirred for 10 minutes at 125° F. The thickening of the reaction mass is apparently arrested and the mass assumes a greenish-brown coloration. The pH is measured to be about 5.7.

One hundred and fifty grams of the chromic oxide solution (one-fourth mol of $CrO_3$) is then added to the reaction mass and the pH is measured to be about 5.1 after about 10 minutes of stirring is 125° F. The reaction mass thickens slightly and has a consistency of a thin syrup.

One hundred and fifty grams more of the chromic oxide solution (one-fourth mol of $CrO_3$) is added to the reaction mass and the pH decreases to about 4.5 after about 10 minutes of stirring at 125° F. The reaction mass continues to thicken to a syruplike consistency.

One hundred and fifty grams of the amine solution (1-mol monoisopropanol amine) is then added and the pH is measured to be about 6.3 after about 10 minutes of stirring at 125° F. The reaction mass appears to decrease in viscosity and assumes a more greenish color. One hundred and fifty more grams of the amine solution (1 mol of monoisopropanol amine) is added and the pH is measured to be about 7.3 while the reaction mass continues to decrease in viscosity. The remaining 150 grams of the amine solution (1 mol of monoisopropanol amine is added and the resulting pH is about 8.8. The resulting reaction mass has a pH of about 8.8 is fluent and readily handled and stirred. This reaction mass is suitable for use as a surface coating component as in example 1.

This example shows how the chromic oxide addition and the base addition can be varied once the initial $CrO_3$/organic acid reaction has been arrested by the addition of a base at a pH above 0.7. The base is used in the proportion of 4 mols of base per mol of $CrO_3$ present in the reaction mass. This is a particularly effective molar ratio for forming inventive chromium-containing components.

Having thus described the invention, what is claimed is:

1. A process for making a performed, fluent, water-dispersible, chromium-containing component for surface coatings comprising the steps of:

mixing at a temperature between about 10° to 100° C. an oleophilic, hydrophobic, organic, carboxylic acid of low volatility, said acid having at least six carbon atoms; and an aqueous solution of chromic oxide in the proportion of about 2 to 50 grams of chromic oxide per each gram equivalent of acid group present in said organic acid to form a reaction mass which gradually thickens, said gradual thickening being accompanied by a gradual decrease in pH, and arresting said thickening short of a friable gel product stage by adding a base to said thickening reaction mass while said mass is at a pH between about 0.5 and about 1.7 to arrest said thickening and form said water-dispersible, fluent, chromium-containing component.

2. The process of claim 1 wherein said hydrated chromic oxide is in the form of a water solution containing at least about 4 parts of water per part $CrO_3$; said base in an amino base or ammonium hydroxide; said thickening is arrested by addition of said base at a pH between about 0.7 and about 1.7 and said organic acid is a resinous, film-forming, polycarboxylic acid.

3. A chromium-containing component formed by the process of claim 1.

4. A chromium-containing component formed by the process of claim 2.

5. The component of claim 4 wherein said polycarboxylic acid is a polymer of a polyenoic acid having 12–44 carbon atoms.

6. The component of claim 4 wherein the chromium content is about 0.01–2 percent by weight of said polycarboxylic acid, said thickening is arrested by addition of said base at a pH in the range of about 1–1.7 and said base is added in proportion of 4 mols of base per mol of $CrO_3$ present in said reaction mass.

7. The component of claim 4 wherein at least a fraction of said base is an alkanolamine.

8. The component of claim 4 wherein said organic acid has in its structure sulfonic acid, phosphonic acid, acid sulfate or acid phosphate functionality.

9. A surface coating composition containing about 1 to about 50 percent by weight of the component of claim 1 dispersed in a fluent carrier therefor.

10. A surface coating composition containing about 1 to 50 percent by weight of the component of claim 4 dispersed in a volatile aqueous carrier.

11. The surface coating composition of claim 10 which has a film-forming vehicle content of about 1–35 percent N.V.M.

12. A concentrate composition for use in compounding water-dispersed surface coatings, said concentrate comprising on a pigment and filler-free basis, about 30–90 percent by weight of film-forming vehicle, at least about 5/100 of which is the component of claim 4, dispersed in about 10 to 70 percent of a volatile aqueous carrier.

* * * * *

PO-1050
(5/69)

UNITED STATES PATENT OFFICE
CERTIFICATE OF CORRECTION

Patent No. 3,615,741              Dated  October 26, 1971

Inventor(s)  Allan B. GILCHRIST

It is certified that error appears in the above-identified patent and that said Letters Patent are hereby corrected as shown below:

Column 2, line 2, insert --about-- after "least".

Column 2, line 61, "of a pH" should read --at a pH--.

Column 4, line 1, "$(C_{114})$" should read --$(C_{1-4})$--.

Column 6, line 21, "$(C_{118})$" should read --$(C_{1-8})$--.

Column 6, line 72, delete "L" after "1.0".

Column 6, line 73, "200" should read --220--.

Column 7, line 66, "concentrated should read --concentrate--.

Column 9, line 31, "while" should read --until--.

Column 9, line 62, "800" should read --880--.

Column 10, line 54, after "continues", add --to thicken--.

Column 11, line 11, "On" should read --One--.

Column 11, line 28, "is" should read --at--.

Column 11, line 45, after "8.8" add --and--.

Column 12, line 19, "in" should read --is--.

Signed and sealed this 23rd day of May 1972.

(SEAL)
Attest

EDWARD M. FLETCHER, JR.          ROBERT GOTTSCHALK
Attesting Officer                Commissioner of Patents